Dec. 13, 1966 H. K. LOTZ 3,291,470
CUTTING DEVICE FOR CONTINUOUS CASTING INSTALLATIONS
Filed Dec. 3, 1965 2 Sheets-Sheet 1

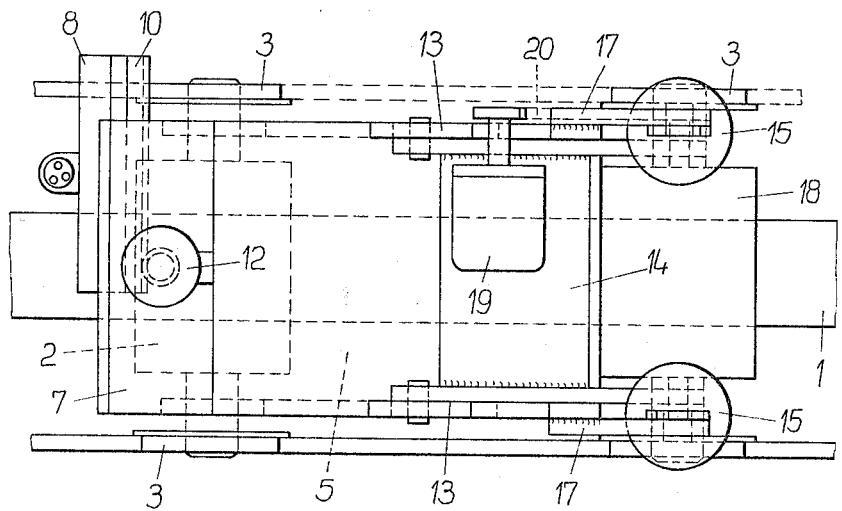

3,291,470
CUTTING DEVICE FOR CONTINUOUS CASTING
INSTALLATIONS
Horst K. Lotz, Frankfurt am Main, Germany, assignor to Messer Griesheim G.m.b.H., Frankfurt am Main, Germany, a corporation of Germany
Filed Dec. 3, 1965, Ser. No. 511,477
Claims priority, application Germany, Dec. 3, 1964, M 63,340
5 Claims. (Cl. 266—23)

The invention relates to equipment in continuous casting installations for cutting off work pieces of certain length from the continually produced bar.

It is known to use cutting torch equipment for this purpose in which the equipment is clamped to the bar and moves along with the bar during the cutting process. The propulsion of the bar in that case takes place by means of a set of rollers, and the cutting mechanism moves with the same speed as the bar during the cutting with the cutting taking place perpendicular to the movement of the bar. This equipment has the disadvantage, however, that during the cutting process the cutting torch is moved along over a plurality of rollers, and the cutting jet coming out of the torch nozzle and the issuing slag, damage the surface of the rollers of the bar support.

In order to avoid this damage, separate bar support equipment can be provided in the cutting area, which can be moved in opposition to the bar supports arranged in front of and behind the cutting area. The cutting torch is then clamped to the bar so that its cutting jet is located between two rollers of the movable bar support. The bar support has a separate drive which is synchronously switched with a roller drive for the movement of the bar. The equipment operates satisfactorily but has the disadvantage that the cutting device and the movable bar support must always have about the same starting position. Additionally, a special synchronized drive is required for the bar support.

An object of this invention is to provide a cutting arrangement which avoids the above disadvantages.

In order to avoid these disadvantages, it is proposed according to the invention to construct the cutting torch carriage and the movable bar support as a common structural element. The drive of the structural element occurs in the usual manner by means of rollers of the continuous casting equipment over the clamp device of the cutting machinery. A separate synchronized drive is thereby avoided and reliable safety equipment can be provided for the cutting torch to remain between the two rollers of the bar support. Even for the return movement of the structural element, contrary to the known arrangements, only a single drive is required.

In the further development of the invention, it is proposed to construct the device for the clamping of the structural element to the bar, as a driving roller. Thus during the motion of the bar the driving roller acts as a stamp, and also acts as a friction roller for the end piece of the bar. The driving roller is suitably provided with a hydraulic pressure device and with a simple electric drive.

The friction roller is advantageously arranged over a support roller in order to avoid bending the bar by clamping.

So that the remaining bar can be divided into individual work pieces as far as possible and a further conveyance of the workpiece is possible on the bar support behind the cutting device, the driving roller, as seen in the motion direction of the bar, is arranged directly in front of the cutting device.

Novel features and advantages of the present invention will become apparent to one skilled in the art from a reading of the following description in conjunction with the accompanying drawings wherein similar reference characters refer to similar parts and in which:

FIG. 2 is a top view of the device of FIG. 1; and

FIG. 3 is a schematic representation of the entire equipment in a side view.

Figure 1:
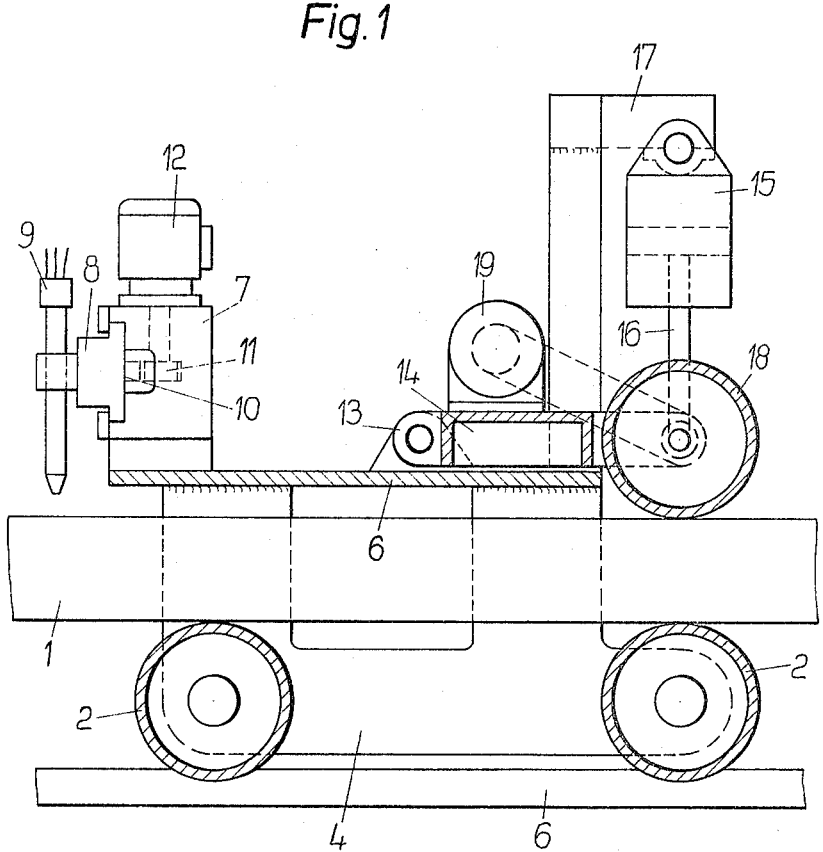
FIG. 1 is a longitudinal cross-section of the bar support carriage with an acetylene cutter device and driving roller.

According to FIGS. 1 and 2, two support rollers 2 with ball-bearing wheels 3 on rails 6, together with carriage frame 4 and the carrier plate 5, all form a carriage which supports bar or workpiece 1 in the area of its entire cutting length.

The acetylene torch unit, consisting of a slide conveyor 7, a torch cradle with torch holder 8 and a cutting torch 9, is mounted upon carriage plate 5. With the aid of a rack 10 the torch cradle is moved at cutting torch speed by means of driving motor 12 upon slide conveyor 7 with driving pinion 11.

On the other side of the carriage plate 5, a counterpoise or counterbalance 14 carries on the free end a driving roller 18. Counterbalance 14 rests on two supports 13. A pair of compressed air cylinders 15 with piston rods 16 are provided to press the driving roller 18 onto the bar 1 or to enable the lifting of driving roller 18. Both of the compressed air cylinders 15 have a support in the form of widenings of the carriage frame. When pistons 16 are retracted, counterpoise 14 pivots on supports 13. A driving motor 19 with a brake at the counterpoise 14 turns or rotates the driving roller 18 with the aid of belt or chain 20.

FIG. 3 represents the cutting course by 22, the cutting distance by 23, the bar support carriage by 24, the driving and directional roller set by 25, and the discharge roller bed by 26.

With the arrangement as shown in FIGS. 1–3, the following work processes can be carried out:

(1) Cutting while the bar moves.

When a bar of desired length passes the cutting torch, compressed air is injected into the compressed air cylinder 15 so that rod 16 is extended and thus the driving roller 18 is pressed onto the moving bar. Since the braked driving motor 19 is not switched on, the bar 1 transmits a pushing force by frictional contact over driving roller 18, over counterpoise 14 and counterpoise support 13 upon carriage 24 and thereby takes with it the support rollers and cutting torch unit.

At the end of the cutting process, by injection of compressed air into the other side of the compressed air cylinder 15, rod 16 is retracted and driving roller 18 is lifted. A return drive (not shown) brings the carriage back to the starting position.

The cut-off piece is pushed on, and, after one or several further pushings by the stationary discharge roller bed or discharge driving roller set, is picked up beyond the cutting area and removed.

(2) Introduction of the casting for cutting first piece.

At the beginning of the operation before the bar reaches conveying rollers 26, these rollers cannot aid in the conveying of the bar. During this initial phase of operation the driving roller 18 is pressed against bar 1 by injecting compressed air into cylinder 15, and motor 19 is switched on. The driving roller 18 then pulls the cast bolt further until the beginning of the bar lies under the cutting torch 9 and the first cut for separating the cast bolt can take place.

(3) Cutting at the casting end and removal of the end piece.

If the end of the bar has passed the driving and directional or conveying roller set 25, friction can no longer be exercised upon carriage 24 over bar 1. The bar piece and carriage stand still, but a straight-running cutting process is carried out to completion without difficulty. The last piece which is not cut is also pushed as far as possible to the runoff side by the driving roller 18, driven by motor 19, until it extends sufficiently beyond the torch 9. Then the entire carriage 24, with the return drive whose driving direction is reversible, rides to the end of the cutting stretch or path 23 where the discharge drive roller set or the discharge roller set 26 takes over the remaining piece. Carriage 24 then returns to its starting position.

The arrangement shown in the drawings and described above represents only one of the possible embodiments of the invention. There are numerous other possibilities in the construction and arrangement of the individual parts of the inventive device without thereby leaving the scope of the invention.

What is claimed is:

1. A cutting device for continuous casting installations including a carriage, means for clamping said carriage to the cast workpiece, cutting means supported on said carriage, said carriage being movable in a cutting area, movable workpiece support means in said cutting area, characterized in that said carriage and said movable workpiece support means form a common structural element, conveying roller means drives the workpiece outside the cutting area, and said clamping means includes driving roller means which acts as a stamp when the workpiece is driven by said conveying roller means and acts as friction roller means when the conveying roller means is inactive in driving the workpiece.

2. A device as set forth in claim 1 wherein said movable workpiece support means includes a support roller, and said driving roller means being positioned above said support roller.

3. A device as set forth in claim 1 wherein said driving roller means is arranged before said cutting means with respect to the direction of workpiece travel.

4. A device as set forth in claim 1 wherein said driving roller means is a single roller, and a piston-cylinder assembly being at each end of said roller for lowering and lifting said roller toward and away from the workpiece.

5. A device as set forth in claim 1 wherein drive means including a motor is connected to said roller for selectively rotating said roller as a friction roller.

References Cited by the Examiner

UNITED STATES PATENTS

| | | | |
|---|---|---|---|
| 1,811,412 | 6/1931 | Whitcare | 25—107 |
| 2,641,041 | 6/1953 | Gano | 25—107 |
| 2,641,042 | 6/1953 | Kopp | 25—107 |
| 2,737,383 | 3/1956 | Baumgartner | 266—23 |
| 3,013,787 | 12/1961 | Joslin | 266—23 |
| 3,112,537 | 12/1963 | Hess et al. | 22—57 |
| 3,129,624 | 4/1964 | Aver | 83—319 |
| 3,190,162 | 6/1965 | Sonneland | 83—319 |

JOHN F. CAMPBELL, *Primary Examiner.*

L. WESTFALL, *Assistant Examiner.*